Dec. 5, 1939.  L. E. COWEY  2,182,333
TAIL SUPPORTING WHEEL OR ITS EQUIVALENT FOR AIRCRAFT
Filed Aug. 11, 1938  3 Sheets-Sheet 1
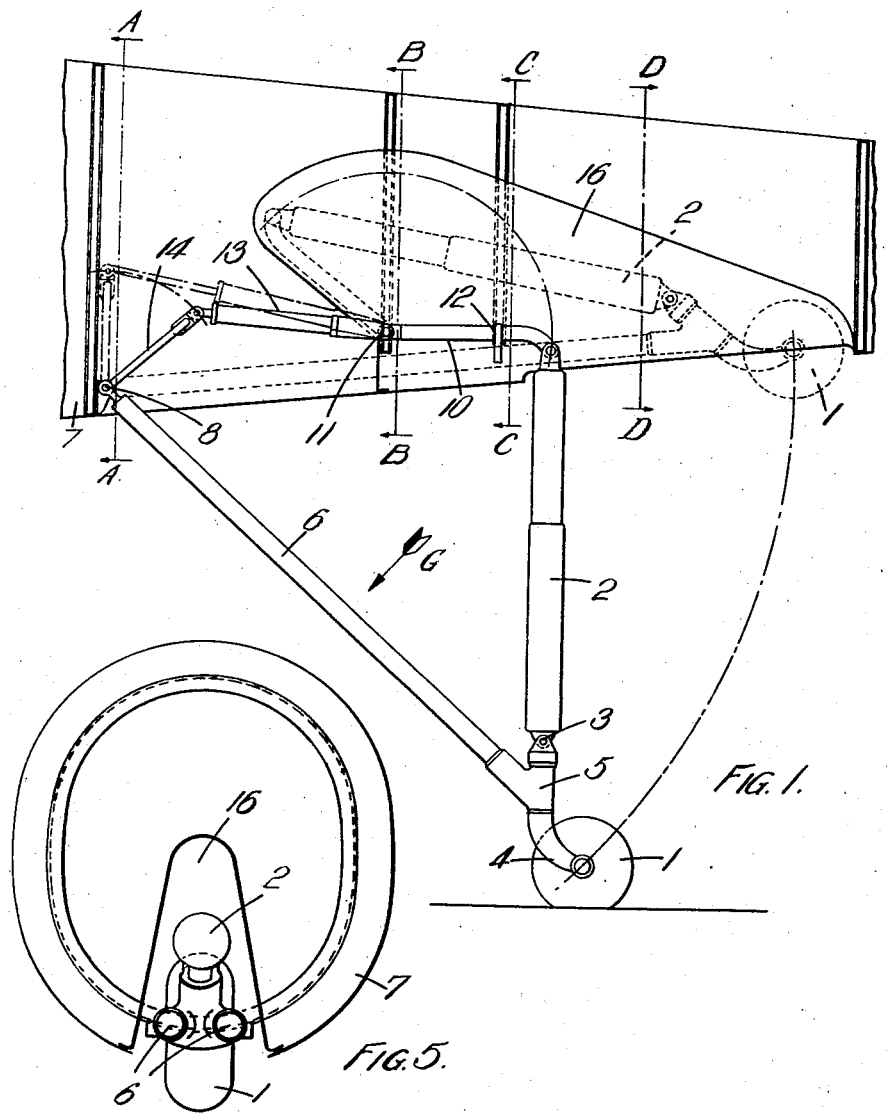
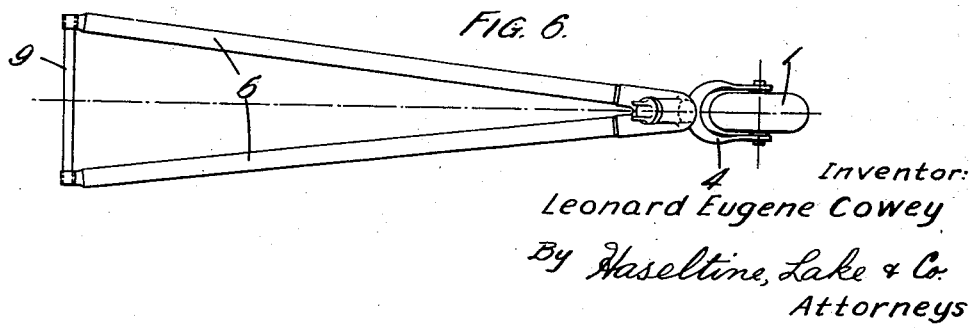
Inventor:
Leonard Eugene Cowey
By Haseltine, Lake & Co.
Attorneys Dec. 5, 1939.  L. E. COWEY  2,182,333
TAIL SUPPORTING WHEEL OR ITS EQUIVALENT FOR AIRCRAFT
Filed Aug. 11, 1938  3 Sheets-Sheet 2
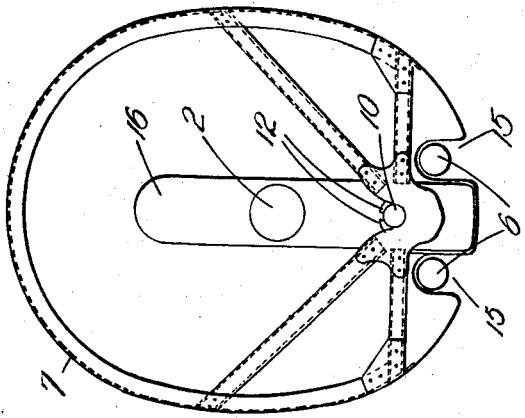
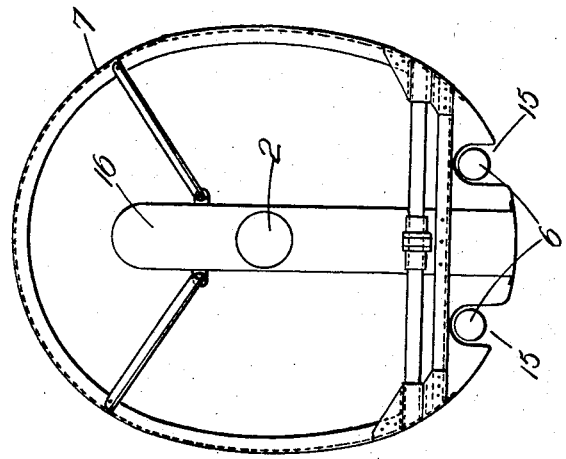
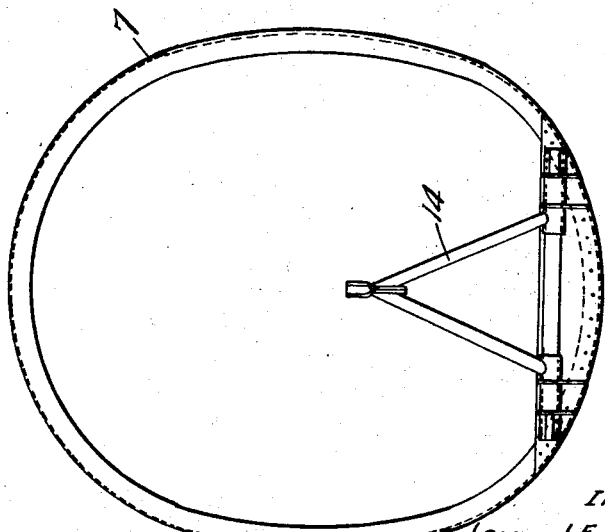
Inventor:
Leonard Eugene Cowey
By: Haseltine, Lake & Co. Attorneys

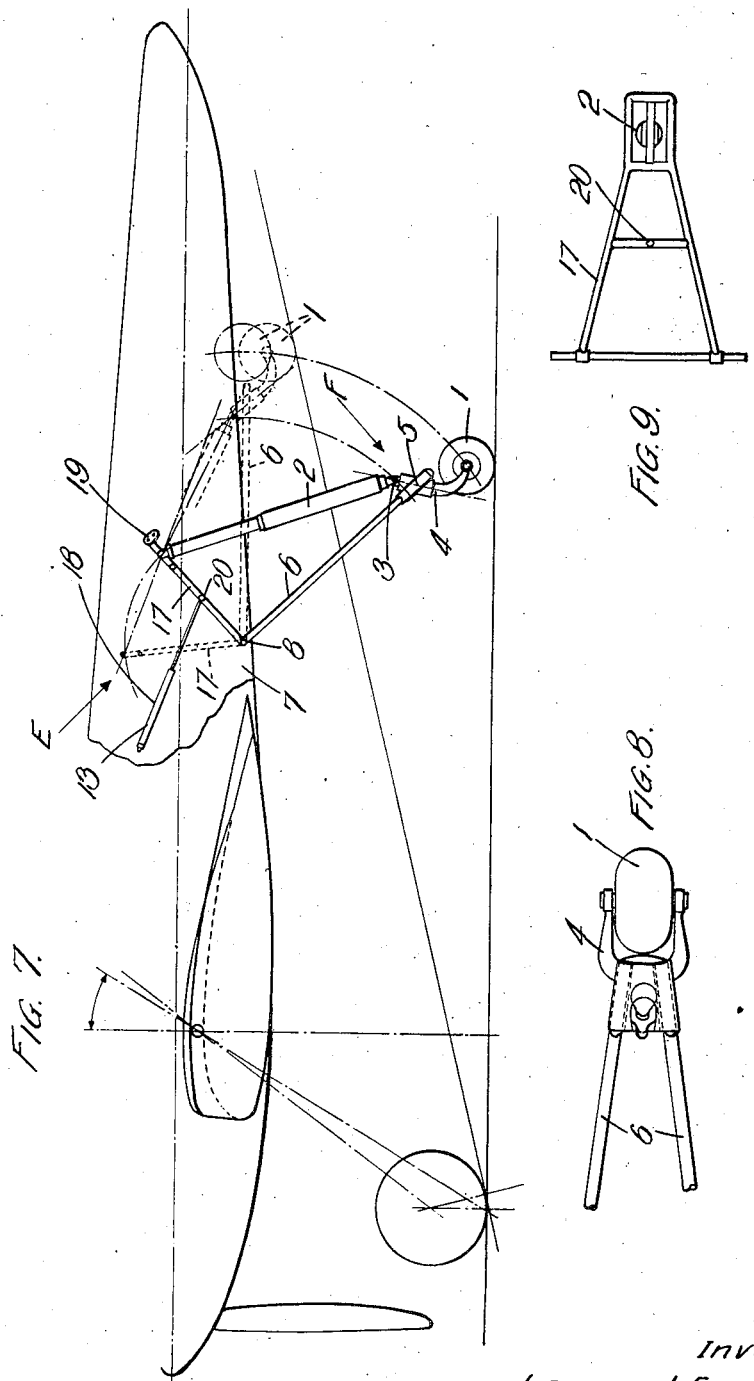

Patented Dec. 5, 1939

2,182,333

UNITED STATES PATENT OFFICE 2,182,333

TAIL SUPPORTING WHEEL OR ITS EQUIVALENT FOR AIRCRAFT

Leonard Eugene Cowey, Kew Gardens, England

Application August 11, 1938, Serial No. 224,289
In Great Britain August 17, 1937

4 Claims. (Cl. 244—102)

This invention relates to tail supporting wheels or their equivalents for aircraft of the kind intended to support the tail of the aircraft when landing and thereby enable the aircraft to be landed in a susbtantially horizontal position, i. e. a position approximating to that assumed during normal level flight. The term "equivalent" is intended to cover a tail skid or like member. Such a tail supporting wheel or its equivalent formed the subject of prior patent application No. 89,054 and included a telescopic compression strut or oleo leg of abnormal length which served to connect the tail wheel or its equivalent with the fuselage of the aircraft in a resilient manner, radius rods being also provided which connected the wheel fork carrying the wheel with the fuselage. The tail wheel or its equivalent forming the subject of the present application may either be used in substitution for the normal tail wheel or tail skid or may be used in addition thereto, the former arrangement being the one preferably employed.

The chief object of the present invention is to evolve an improved method of retracting or partially retracting the tail wheel or skid and its associated mechanism whereby the somewhat high air resistance set up by the tail wheel or skid and its associated parts when depending from the fuselage will be reduced to a considerable extent.

According to the invention the upper end of the telescopic compression strut or oleo leg is pivotally connected with a link member which in turn is adapted for pivotal connection with the fuselage of the aircraft, the compression strut being also connected at its lower end to radius rods which are also adapted for pivotal connection with the fuselage, retraction or partial retraction of the tail wheel or its equivalent being effected by moving the compression strut and its associated tail wheel or equivalent member rearwardly and upwardly, the link member at the same time moving upwardly and turning forwardly about the point at which it is connected with the fuselage, the compression strut and tail wheel or its equivalent thereby assuming a position in which they lie wholly or partially within the contour of the fuselage when not in use.

With the tail wheel in its lowered position the aircraft when on the ground assumes a position approximating to that of normal level flight, the position of the aircraft in relation to the ground being susbtantially the same for take-off as when landing. In certain cases where a particularly quick take-off is required it is desirable that the aircraft shall assume a more or less tail down position prior to taking off and a further object of the invention is to evolve a construction of tail wheel or equivalent member and its associated mechanism which will permit of the aircraft assuming either a tail up or tail down position when on the ground as desired.

In order that the said invention may be clearly understood and readily carried into effect the same will now be more fully described with reference to the accompanying drawings, wherein:

Figure 1 is a fragmentary section of a monocoque type of aircraft fuselage incorporating a tail wheel and its associated mechanism constructed in accordance with the invention.

Figures 2, 3, 4 and 5 are sectional views drawn to an enlarged scale on the lines A—A, B—B, C—C and D—D in Figure 1.

Figure 6 is a view looking in the direction of the arrow G in Figure 1.

Figure 7 is a fragmentary sectional view illustrating a modified construction.

Figure 8 is a fragmentary view drawn to an enlarged scale looking in the direction of the arrow F in Figure 7.

Figure 9 is a fragmentary view also drawn to an enlarged scale looking in the direction of the arrow E in Figure 7.

In the construction illustrated by Figures 1 to 6 of the accompanying drawings which show the invention applied to an aircraft fuselage of the monocoque type, the tail wheel 1 in Figure 1 is shown in its fully lowered position by full lines and by dotted lines in its retracted position, in which latter position it lies substantially within the contour of the fuselage, the mechanism associated with the tail wheel also lying within the contour of the fuselage when the tail wheel is in its retracted position. A telescopic compression strut 2 or oleo leg of abnormal length is pivotally connected at its lower end at the point 3 with the wheel fork 4 or its associated bearing 5, the tail wheel and its associated fork having if desired a free or restrained castoring action, the fork bearing 5 being rigidly connected with two forwardly and upwardly projecting radius rods 6 which in turn are pivotally connected to the fuselage 7 at their upper ends at the points 8, the radius rods being connected together by means of a transversely arranged tie bar as shown in Figure 6. The upper end of the compression strut 2 is pivotally connected with a link member 10 which when the tail wheel is in its fully lowered position occupies a substantially horizontal position within the contour of the fuselage and which extends forwardly of the compression strut, the link member being pivotally connected at its forward end at the point 11 to a fixed part of the fuselage. The link member and the tail wheel or its equivalent in its lowered or operative position is engaged by any suitable or usual form of snap gear or latch 12 which serves to lock the link in a horizontal position, retraction of the tail wheel being effected preferably by means of a hydraulic jack 13 anchored to the fuselage at a point adjacent the point 11 and connected at its opposite end wtih a lifting lever 14 disposed within the fuselage and extending upwardly and rearwardly, and being rigidly associated with the radius rods so that it forms virtually an integral part therewith. The arrangement is such that upon the hydraulic jack being operated to move the tail wheel into its retracted or otherwise inoperative position, the radius rods through the medium of the hydraulic jack and lifting lever are caused to turn upwardly about their pivotal points into a position in which they lie within recesses 15 formed in the under surface of the fuselage, the snap gear 12 being at the same time released to enable the link member 10 to turn upwardly and forwardly and move the compression strut 2 and its associated tail wheel first upwardly and rearwardly and finally forwardly into a position in which the compression strut is located within the fuselage and the tail wheel occupies a position in which it is almost completely housed therein, the position of the tail wheel and its operating mechanism when in its inoperative position being indicated by dotted lines in Figure 1.

It is preferred that the fuselage of the aircraft shall include an inverted well or housing 16 adapted to receive the compression leg and the link member and tail wheel or its equivalent or a part thereof when the tail supporting means is in its inoperative position, and although it is within the scope of the invention to arrange the radius rods so that they do not actually lie within the contour of the fuselage when in their retracted position but lie adjacent thereto, it is preferred that the under surface of the fuselage as hereinbefore referred to shall be formed with the two recesses 15 for the reception of the radius rods when the device is retracted. For convenience of inspection the recesses may be formed in a detachable bottom panel on the fuselage which can be quickly detached when required.

In the modified construction illustrated by Figures 7 to 9 a tail wheel is illustrated which is intended to support the tail of the aircraft when the latter is in either a tail-up or tail-down position. The aircraft illustrated by Figure 7 is shown in a position approximating to that assumed during normal level flight, this position approximating to the position taken up by the aircraft when landing, the tail wheel being shown in its fully lowered position. Although an aircraft fitted with a tail supporting wheel arranged in accordance with Figures 1 to 6 of the accompanying drawings, in which the tail is raised to an unusually high position during landing and take-off, the aircraft being substantially horizontal, could be flown-off without a take-off run of unusually great length, it is often desirable for the take-off run to be appreciably shortened and with the arrangement illustrated by Figures 7 to 9 the pilot of the aircraft has the choice of either taking off when the aircraft is in a substantially horizontal position, that is to say in a position approximating to that assumed during landing, or in a more or less tail down position, the tail wheel 1 being shown in its fully lowered position by full lines and by dotted lines in its fully raised position, in which latter position the aircraft will take up a position in which the fuselage is inclined to the ground at a relatively large angle.

The tail wheel 1 as in the previously described arrangement is mounted in a wheel fork 4 which is rotatably mounted in a bearing 5, the bearing 5 being rigidly associated with radius rods 6 which are pivotally connected at their upper ends to the fuselage 7 at the points 8, the wheel fork or bearing being pivotally connected at the point 3 to a compression strut or oleo leg 2. In lieu of the member 14, however, a link in the form of a frame 17 illustrated clearly in Figure 9 is pivotally associated with the fuselage at the point 8 and is also pivotally connected at the point 18 with the upper end of the compression strut, the frame extending upwardly beyond that point and being engaged by any suitable form of snap gear or latch 19 which serves to maintain the frame normally in the position shown by full lines in Figure 7, when the tail wheel is in any operative position. A hydraulic jack 13 is anchored at one end to a fixed part of the fuselage and is pivotally connected at its opposite end to the frame member 17 at the point 20, the hydraulic jack serving to move the frame member, radius rods, compression leg and tail wheel into either the fully extended position or fully retracted inoperative position. The tail wheel projects below the surface of the fuselage and when in the position shown by dotted lines has a limited amount of upward travel, the position occupied by the tail when moved upwardly to its fullest extent, as for example as a result of the tail wheel striking an obstruction when taxiing, being represented by chain dotted lines, the fuselage being formed with a suitable well or recess for the accommodation of a part of the tail wheel.

By virtue of the triangulated arrangement of the radius rods, compression strut and their connecting frame, and the angle assumed by the compression strut in relation to the vertical in any position between its two terminal positions, the compression strut when in the position shown by full lines in Figure 7 will be very much more resilient in operation than when in the position shown by dotted lines. It will readily be appreciated that when the aircraft is in a substantially horizontal position compressive force exerted on the compression strut as a result of the weight of the tail will not be so great as when the fuselage occupies a tail down position and by arranging the compression strut so that when the aircraft is in a tail down position the strut is inclined at a relatively small angle to the horizontal, the tail wheel when the aircraft is in a horizontal position will have a relatively long travel in an upward and downward direction whilst when the aircraft is in a tail down position the tail wheel will have a relatively short travel. Thus the associated parts may be so arranged that whatever weight is applied to the tail wheel due to the various angles assumed by the aircraft in relation to the horizontal, the supporting forces are at all positions approximately proportional to the load. Hence the pilot when taking off has a wide range of selection for his taking off attitude, the tail of the aircraft being lowered or raised by raising or lowering the elevator control surfaces.

As will be apparent from Figure 7, the main landing wheels of the aircraft are arranged more forwardly of the centre of gravity of the aircraft than is the usual practice and it is intended that the tail wheel described and illustrated shall take the place of the usual tail wheel or skid normally provided. If desired, however, the tail wheel may be auxiliary or in addition to the usual tail wheel or skid which may be of a more or less orthodox construction.

In the arrangement shown by Figures 1 to 6 the telescopic compression strut may have such a length of travel as will enable the tail to sink towards the ground when taxiing to a limited extent, or alternatively the length of travel may be materially reduced, in which case the tail of the aircraft will in all cases occupy a raised position, that it to say a position in which the fuselage of the aircraft occupies a substantially horizontal position.

It is obvious that some form of remote control would necessarily be employed to release the latches 12 and 19 when required. Any suitable form of remote control could be used and probably the most convenient method for operating the latches would be by a flexible cable such as a Bowden cable or Arens control. Alternatively, the latches could be released electrically or by means of hydraulic mechanism.

What I claim and desire to secure by Letters Patent of the United States is:

1. A mounting for a retractable or partially retractable aircraft tail wheel comprising radius rods connecting the tail wheel with the aircraft fuselage in a pivotal manner and extending upwardly and forwardly of said tail wheel, a telescopic compression strut connected at its lower end to the tail wheel and a link member pivotally connected at its forward end with the fuselage and at its rearward end with the upper end of the compression strut and movable upwardly and forwardly about the point at which it is connected to the fuselage to cause the radius rods, compression strut and tail wheel to be raised into a position in which they lie wholly or partially within the contour of the fuselage.

2. A mounting for a retractable or partially retractable aircraft tail wheel comprising radius rods connecting the tail wheel with the aircraft fuselage in a pivotal manner and extending upwardly and forwardly of said tail wheel, a telescopic compression strut connected at its lower end to the tail wheel, a link member pivotally connected at its forward end with the fuselage and at its rearward end with the upper end of the compression strut, a lifting lever rigidly associated with said radius rods and a hydraulic jack connected with said lever and arranged to move the radius rods and compression strut and their associated tail wheel through the medium of said lever into their retracted or partially retracted position.

3. A mounting for a retractable or partially retractable aircraft tail wheel comprising radius rods connecting the tail wheel with the aircraft fuselage in a pivotal manner and extending upwardly and forwardly of said tail wheel, a telescopic compression strut connected at its lower end to the tail wheel, a link member pivotally connected at its forward end with the fuselage at the point at which the radius rods are connected with said fuselage and at its rearward end with the upper end of said compression strut, the link, compression strut and radius rods forming a triangulated structure pivotal as a whole about the point at which the radius rods are connected with the fuselage and a hydraulic jack pivotally connected at its opposite ends with said link and fuselage for moving the tail wheel and its associated mechanism into its retracted position.

4. A mounting for a retractable or partially retractable aircraft tail wheel comprising radius rods connecting the tail wheel with the aircraft fuselage in a pivotal manner and extending upwardly and forwardly of said tail wheel, a telescopic compression strut connected at its lower end to the tail wheel, a link member pivotally connected at its forward end with the fuselage at the point at which the radius rods are connected with said fuselage and at its rearward end with the upper end of said compression strut, and a hydraulic jack pivotally connected at its opposite ends with said link and fuselage for moving the tail wheel and its associated mechanism into its retracted position, the tail wheel when retracted projecting beneath the fuselage to a sufficient extent to support the tail of the aircraft in a tail down position if required for the purpose of facilitating take-off.

LEONARD EUGENE COWEY.